(12) United States Patent
Bohn (10) Patent No.: US 9,474,207 B1
(45) Date of Patent: Oct. 25, 2016

(54) COMBINE CLEAN GRAIN ELEVATOR POWER FOLD AUGER

(71) Applicant: Jeffrey D. Bohn, Castalia, OH (US)

(72) Inventor: Jeffrey D. Bohn, Castalia, OH (US)

( * ) Notice: Subject to any disclaimer, the term of this patent is extended or adjusted under 35 U.S.C. 154(b) by 19 days.

(21) Appl. No.: 14/611,745

(22) Filed: Feb. 2, 2015

Related U.S. Application Data

(60) Provisional application No. 61/936,529, filed on Feb. 6, 2014.

(51) Int. Cl.
*A01D 41/12* (2006.01)

(52) U.S. Cl.
CPC ........... *A01D 41/1217* (2013.01); *A01D 41/12* (2013.01)

(58) Field of Classification Search
CPC .................. A01D 41/1208; A01D 41/1217
USPC ............. 198/312, 318, 600, 657, 671, 861.3
See application file for complete search history.

(56) References Cited

U.S. PATENT DOCUMENTS

| 4,409,780 A * | 10/1983 | Beougher ............. A01B 73/02 172/456 |
| 9,113,598 B2 * | 8/2015 | Wood .................... A01D 90/10 |
| 2012/0024670 A1 * | 2/2012 | Koerselman ....... A01D 41/1217 198/671 |

* cited by examiner

*Primary Examiner* — Gene Crawford
*Assistant Examiner* — Lester Rushin
(74) *Attorney, Agent, or Firm* — Jerry Semer (57) ABSTRACT

The article of manufacture is a kit that when installed upon a combine will enable the grain tank's folding auger to be raised and lowered by a push of a button in the cab. The kit contains a collar to encircle the auger tube, two universal joints, a linear actuator, and a mounting plate. To install the kit, one bolts the mounting plate to the bottom of the combine's grain tank. Next, the collar is bolted around the auger tube. Then, the installer mounts the linear actuator with a universal joint on each end between the collar and the mounting plate. The installer next installs the safety limiting switch and wires the system. Once all the wiring is completed, the installer returns to the combine's cabin and tests the system. The system contains a safety system that informs the operator of the combine when the auger is in operating or folded position.

20 Claims, 10 Drawing Sheets

COMBINE CLEAN GRAIN ELEVATOR POWER FOLD AUGER

FIELD OF THE INVENTION

The invention relates to the field of accessories for a combine to make the operator's work easier and safer, and more particular, to the field of a kit and method to add a linear actuator used to raise the grain tank auger tube on a combine.

BACKGROUND OF THE INVENTION

The clean grain tank power fold auger on a combine when in use rises out of the grain tank. When the power auger is not in use it is folded down. This keeps the auger from being damaged when storing and driving the combine on the highway. Many John Deere combines that were built since the year 2000 have a manual fold clean grain tank auger. In order for an operator to use the auger, he must climb up on the back of the combine into the grain tank and lift the auger into proper position and fasten it securely. To do this causes many safety and Workmen's Compensation concerns. When the operator of the combine does this, he runs the risk of falling off the top of the combine or slipping within the grain tank. The grain tank floor is usually covered with loose grain that makes the floor slippery. There are also numerous problems or accidents that can be caused by the lifting and insertion of the auger in its proper position. Thus, one of the main objectives of this invention is to create a safer combine. Not only will the invention make the combine environment safer, it will also enable the operator to do his work quicker and with less effort.

To achieve these goals, the inventor has designed a kit to attach a linear actuator to the combine and the auger to lift the auger and place it in operating position. The linear actuator also lowers the auger when the operator no longer needs the use of the auger.

There are several safety features of the invention. The first, the operator no longer has to climb the back of the combine and into the grain tank. Nor does he have to lift the auger and put it in position in the slippery grain tank. This is all done by the invention, by toggling a button in the cab. When the operator toggles a button in the cab, the linear actuator lifts the auger and places it in operating position. The operator is able to watch this occur through the back window of the combine cab. The system also incorporates a safety switch. The safety switch tells the operator if the auger is in operating position. The switch also is hooked to visual and audio alarms within the cab. The safety system notifies the operator if he has forgotten to fold the auger into operating position. Failure to fold the auger up can lead to serious damage to the combine.

The feature that enables the invention is a kit that contains a linear actuator that can be positioned on the combine to lift the auger. One of the most important parts in the kit is a spacer, a hex stub shaft, and a bearing with a hex inter diameter that replaces the bearing on the top of the auger. By just hooking the linear actuator to the auger tube a problem arises. In the normal set up, the drive hub on the gear case can interfere with the drive pin on the auger when folding the auger into operating position. When the auger is manually folded into the operating position and the two drives interfere with each other, the operator has to grab the auger and turn it forward or backward until the two align and pass by each other engaging the drive.

To overcome this problem the inventor has devised a kit to augment the bearing. The inventor replaces the bearing on the auger with a one inch thick aluminum spacer block, a hex stub shaft, and a bearing with a hex inter diameter for the new style augers and a ½ inch thick aluminum spacer block, a hex stub shaft, and a bearing with a hex inter diameter for the old style augers. This allows the auger to glide up and down in the bearing giving the drive hub and drive pins enough room that they will not interfere with each other when folding the auger into the operating position. With this setup, the drive pin and the drive hub align themselves with the centering guide on the drive hub by allowing the drive pins to move up far enough that the drive pin does not interfere with the drive hub. The drive hub will push the auger hex shaft up far enough through the bearing causing the augur to move into operating position. Once the drive hub begins to move, the drive hub and the drive pins will engage. The rest of the kit is comprised of a mounting plate, a linear actuator with universal joints on both ends, a collar for encircling the auger tube, and a safety switch. The mounting plate is attached to the floor of the grain bin and the collar is attached around the auger tube. The linear actuator is attached to the collar and the mounting plate via universal joints. The safety switch is placed in the position where it can detect when the auger is unfolded.

The kit is designed for easy installation. The mounting plate is placed in position on the bottom of the grain bin in a position that already contains bolts. The two universal joints enable the linear actuator to work trouble-free and make for easy assembly with less alignment.

SUMMARY OF THE INVENTION

Figure 6:
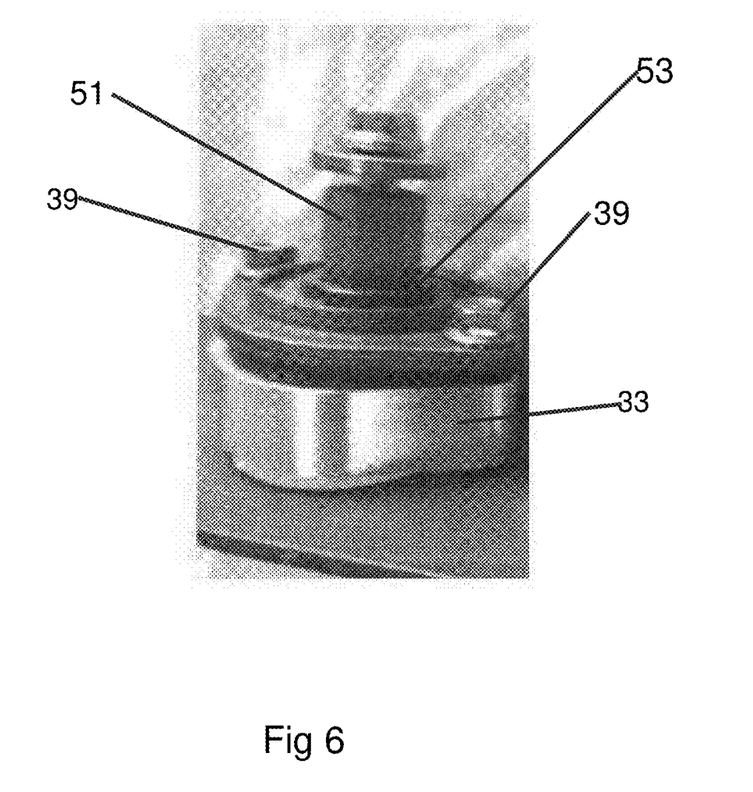
FIG. 6 is a view of the aluminum spacer block, hex shaft stub, hex center bearing and the carriage bolts.

The article of manufacture is a kit that when installed upon a combine will enable the grain tank's folding auger to be raised to operating position and lowered to folded position by a push of a button in the cab. The kit contains: an aluminum spacer block, a hex stub shaft, a bearing with a hex inter diameter, a collar consisting of two semicircular pieces of steel of the sufficient diameter to encircle the auger tube, sufficient bolts to attach the two semicircular pieces of steel together, a top universal joint, a bottom universal joint, a linear actuator, and a mounting plate with sufficient bolts. To install the kit, the installer removes the bearing from the top of the auger. Then the installer, bolts the collar around the auger tube. At this point, the installer must determine whether it is an old or new style auger. FIG. 6 shows the position of the aluminum spacer block, the hex stub shaft, the bearing with a hex inter diameter, and the carriage bolts. For the old style auger the ½ inch thick aluminum spacer block and 2-10 mm×45 mm carriage bolts are used. For the new style auger, the bearing neck is cut off the auger. Then, FIG. 6 shows the position of the aluminum spacer block, the hex shaft stub, the bearing with hex inside diameter and the carriage bolts except that 2-10 mm×55 mm carriage bolts and the 1" thick spacer block are used. Then one bolts the mounting plate to the bottom of the combine's grain tank. The next step is to place the bottom universal joint's bottom socket over the mounting plate pin. Then, one mounts the linear actuator on the bottom universal joint. Next, the top universal joint is seated on the top of the linear actuator. The installer then attaches the top universal joint to the collar. If the kit has been properly installed, the linear actuator should be approximately vertical to the ground when the auger tube is in operating position.

The installer next installs the safety limiting switch and wires the system. Once all the wiring is completed, the installer returns to the combine's cabin and tests the system. The system contains a safety system that informs the operator of the combine when the auger is in operating position and folded position.

DETAILED DESCRIPTION OF THE PREFERRED EMBODIMENT

Figure 1:
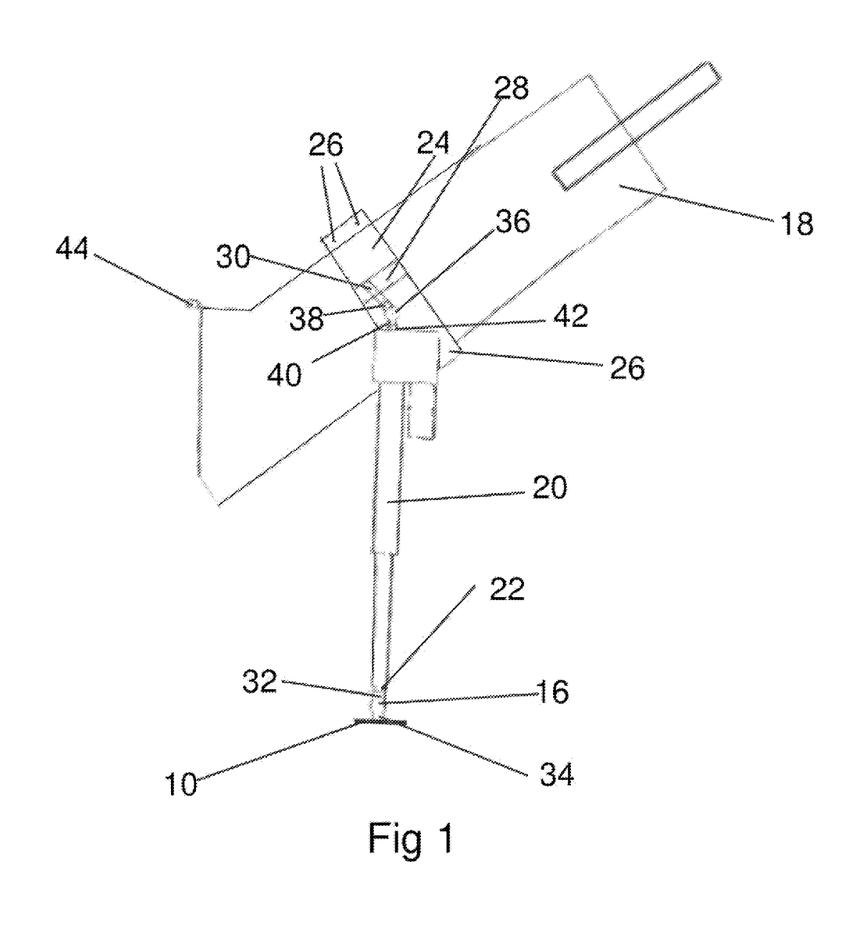
FIG. 1 is a view of the invention.
Figure 3:
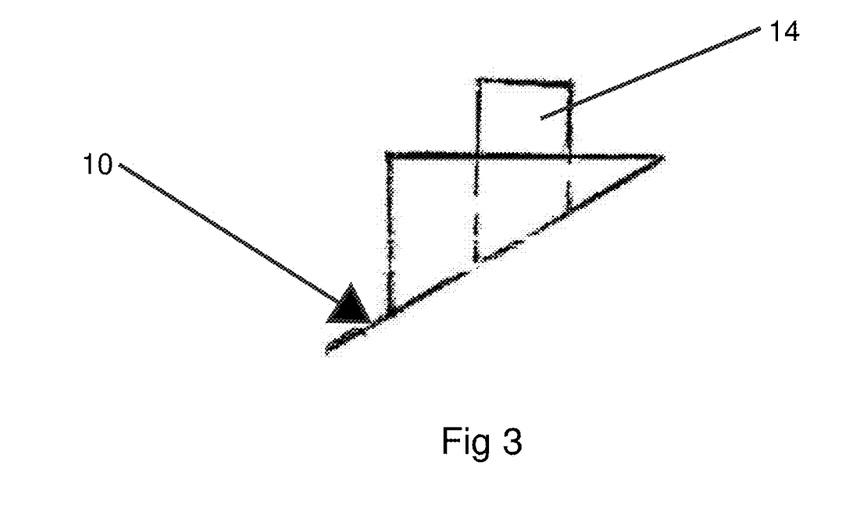
FIG. 3 is a side view of the mounting plate.

FIG. 1 is a view of the invention. The linear actuator 20 in the preferred embodiment is a heavy-duty linear actuator with a 12 inch stroke and 450 pounds of force. In the preferred embodiment, the linear actuator is 31.5 inches when fully extended. Applicant uses a linear actuator 20 that has a limit switch at the end of the stroke for extra safety. The linear actuator 20 mounts on the mounting plate 10 with a bottom universal joint 16. The bottom universal joint 16 has a top socket 32 and a bottom socket 34. The bottom socket 34 of the bottom universal joint 16 fits over the mounting plate pin 14 which is shown in FIG. 3 and the top socket 32 on the top of bottom universal joint 16 fits over the bottom pin 22 on the bottom of the linear actuator 20.

Around the auger tube 18 is a collar 24. Collar 24 is comprised of two semicircular pieces of steel that are bolted together on their ends. The two pieces of collar 24 are placed over the auger tube 18 and the collar 24 is bolted together. Collar 24 in the preferred embodiment is formed by two pieces of 4 inch split band steel (approximately 11 inches in length) that are bent in a semicircular form. The two pieces of collar 24 are fit around the auger tube 18 and attach at the ends with two bolts 26. A tube 28 attaches to the collar 24. The tube 28 in the preferred embodiment is welded to the collar 24 and made with 1½ inch square tubing. A pin 30 is welded into tube 28.

The top universal joint 36 is between the top of the linear actuator 20 and the collar 24. The top universal joint 36 has a top socket 38 and a bottom socket 40. The bottom socket 40 fits over the top pin 42 on top of the linear actuator 20. The top socket 38 fits over pin 30 extending from the collar 24.

Figure 7:
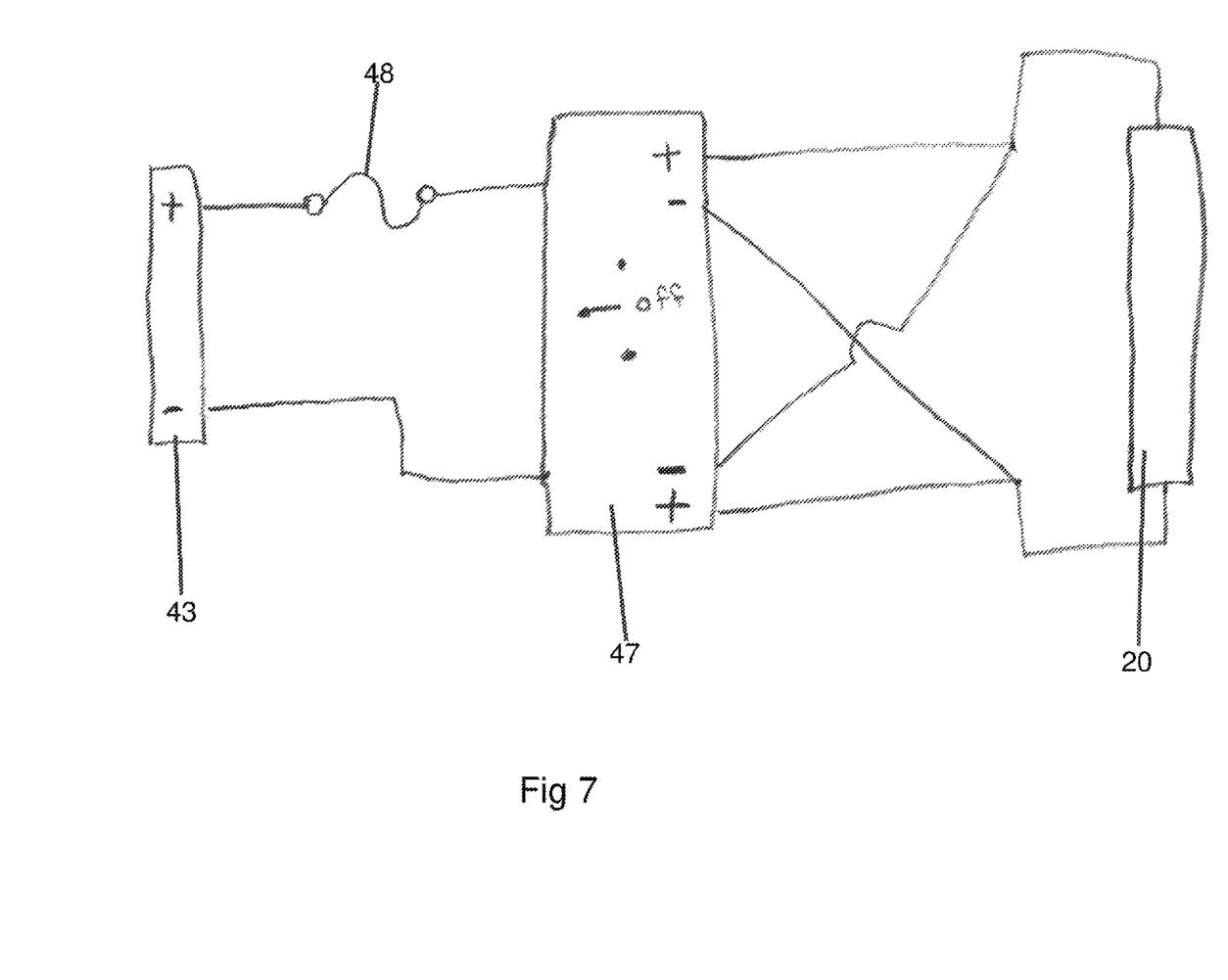
FIG. 7 is the wiring schematic for the linear actuator.

The linear actuator 20 runs on 12 volts, 20 amps. The linear actuator 20 hooks to the electrical system of the combine by wiring to the accessory power strip 44 located in the cab of the combine. A wiring diagram is shown in FIG. 7. A two lead 16 gauge wire runs from the positive and negative terminals on the power strip 43 to a toggle switch 47. A fuse 48 is between the power strip 43 and the toggle switch 47 on the positive lead. The toggle switch 47 is a double pole double throw toggle switch. The toggle switch 47 has three positions. The first position turns on the linear actuator 20 to lift the auger tube 18. The second position turns on the linear actuator 20 to lower the auger tube 18. The third position turns off the linear actuator 20. Wires run from the toggle switch 47 to the linear actuator as shown in FIG. 7 to enable the linear actuator to run in both directions to lift the auger tube 18 and lower the auger tube 18.

Figure 4:
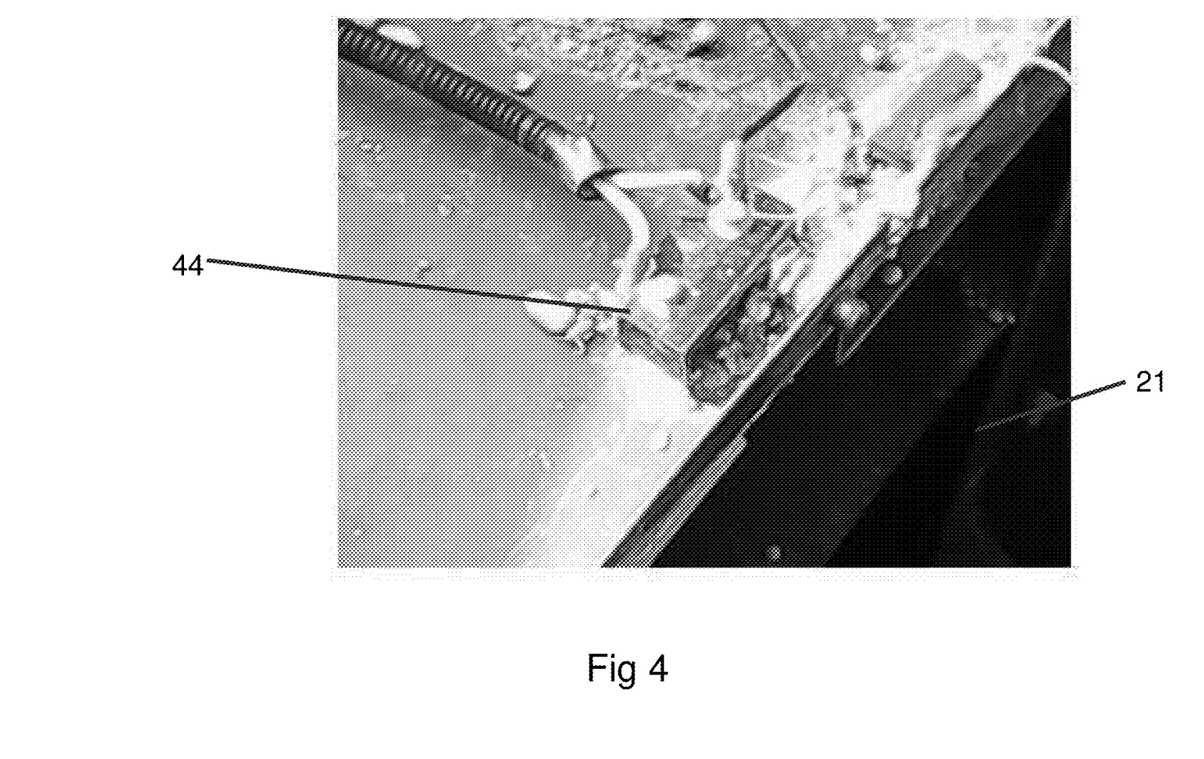
FIG. 4 is a view of the safety limit switch when the auger tube is down.
Figure 5:
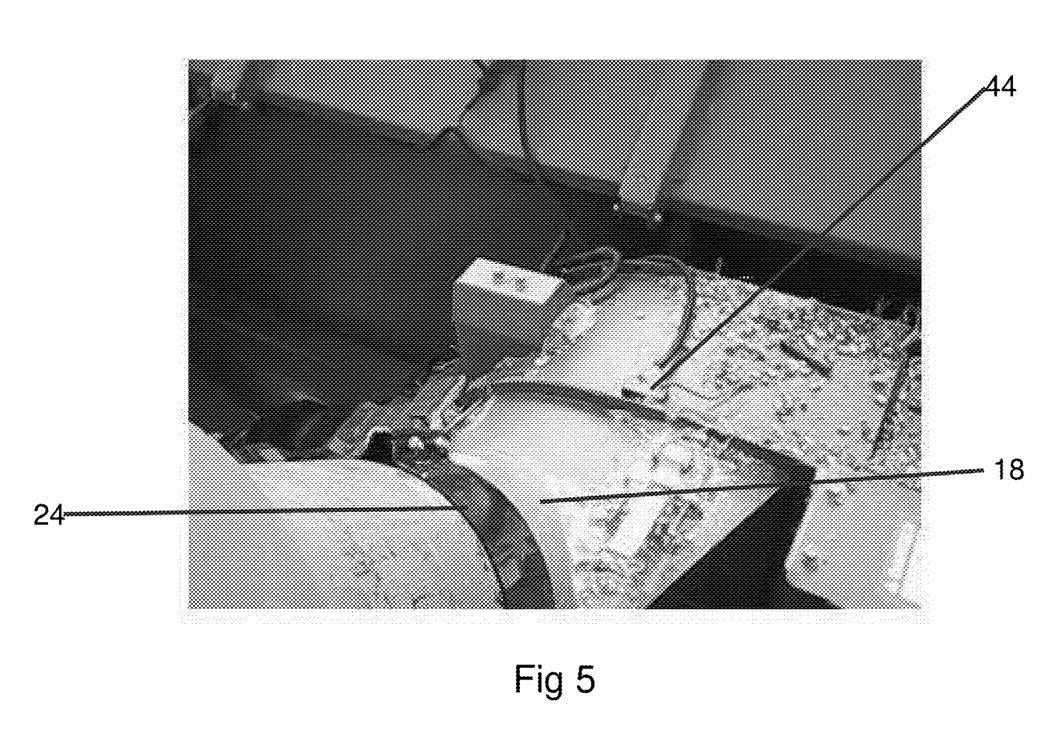
FIG. 5 is a view of the safety limit switch when the auger tube is in operating position.

The safety limit switch 44 is located at the point where the auger tube 18 folds away from the other portion of the auger that brings the grain up in the combine as shown in FIG. 4. When the auger tube 18 is folded down an opening 21 appears between the auger tube 18 and the auger that brings a grain up in the combine as shown in FIG. 4. When the invention raises the auger tube auger tube this opening 21 closes as shown in FIG. 5. When the auger closes opening 21 and is in operating position it activates safety limiting switch 44. Safety limiting switch 44 notifies the operator in the cabin of the combine that the auger tube 18 is in operating position.

Figure 8:
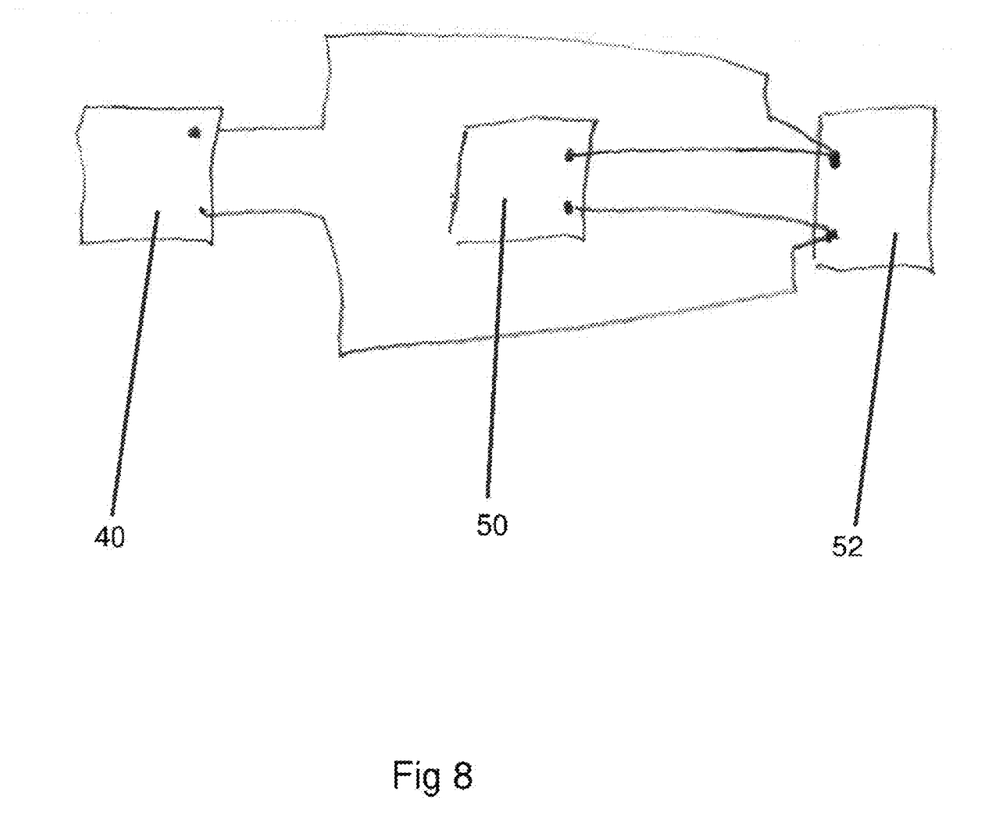
FIG. 8 is the wiring diagram of the safety limit switch.

The safety limit switch 44 is wired into the bin full switch 50 mounted at the top of the grain tank. The bin full switch 50 sets off a visual and audible alarm 52 in the cab when the tank is full. The safety limit switch 44 is wired in parallel with the bin full switch 50 as shown in FIG. 8, so that when safety limit switch 44 is activated, the bin full the alarm will go off in the cab.

In order for the auger tube 18 to fold to operating position and the auger to work properly, the drive hub on the gear case must not interfere with the drive pin on the auger. When the auger tube 18 is manually folded into the operating position and the two drives interfere with each other, the operator has to grab the auger and turn it forward or backward until the two line up and pass by each other engaging the drive. The inventor overcomes this problem by changing the bearing at the top of the auger tube 18 to allow the auger and the drive pin to move up far enough so that they will not interfere with the drive hub on the gear case. In the prior art the bearing at the top of the auger has a round inside diameter. The inventor removes this. The inventor uses an aluminum spacer block 33 or 35, a hex stub shaft 51, a bearing with a hex inter diameter 53 to solve the problem. This allows the auger 18 to float up and down in the bearing giving the drive hub and drive pins enough room that they will not interfere with each other when folding the auger into the operating position. With this setup, the drive pin and the drive hub align themselves with the centering guide on the drive hub by allow the drive pins to move up far enough that the drive pin does not interfere with the drive hub. The drive hub will push the auger tube 18 with hex shaft stub 51 up far enough through the bearing allowing the auger tube 18 to move into operating position. Once the drive hub begins to move, the drive hub and the drive pins will engage.

The kit for creating the power fold auger is comprised of the following parts: a collar 24 consisting of two semicircular pieces of steel of the sufficient diameter to encircle the auger tube 18, sufficient bolts to attach the two semicircular pieces of steel together, a top universal joint 36, a bottom universal joint 16, a linear actuator 20, a mounting plate 10 with sufficient bolts to mount to the bed of the grain tank, a 2¼ in. long 1 in. hex stub shaft 51, a bearing with a hex inter diameter 53, a 12 mm×74 mm flanged bolt, and a heavy flat washer. The kit also contains special parts for the old and new style augers. For the old style auger, the kit contains: a ½, in. thick aluminum spacer block 33 and 2-10 mm×45 mm carriage bolts 39. For the new style auger, the kit contains 2-10 mm×55 mm carriage bolts 39 and the 1" thick spacer block 35.

Figure 6A:
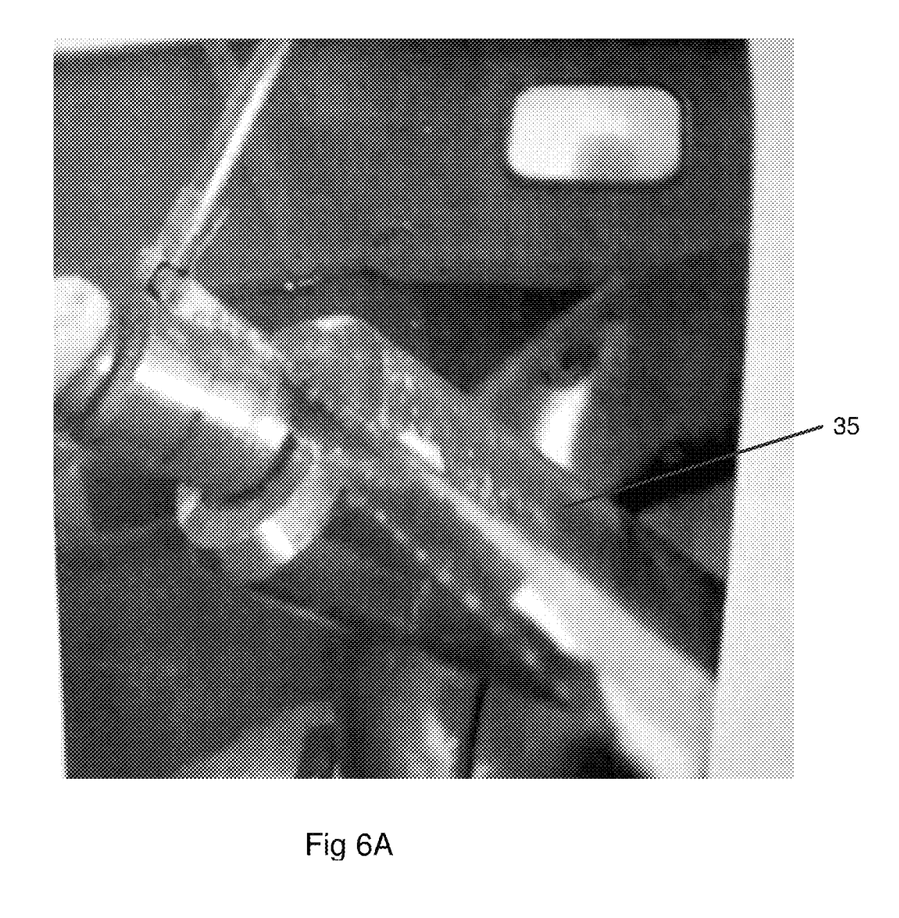
FIG. 6A is a view of the bearing neck being cut off the auger.
Figure 6B:
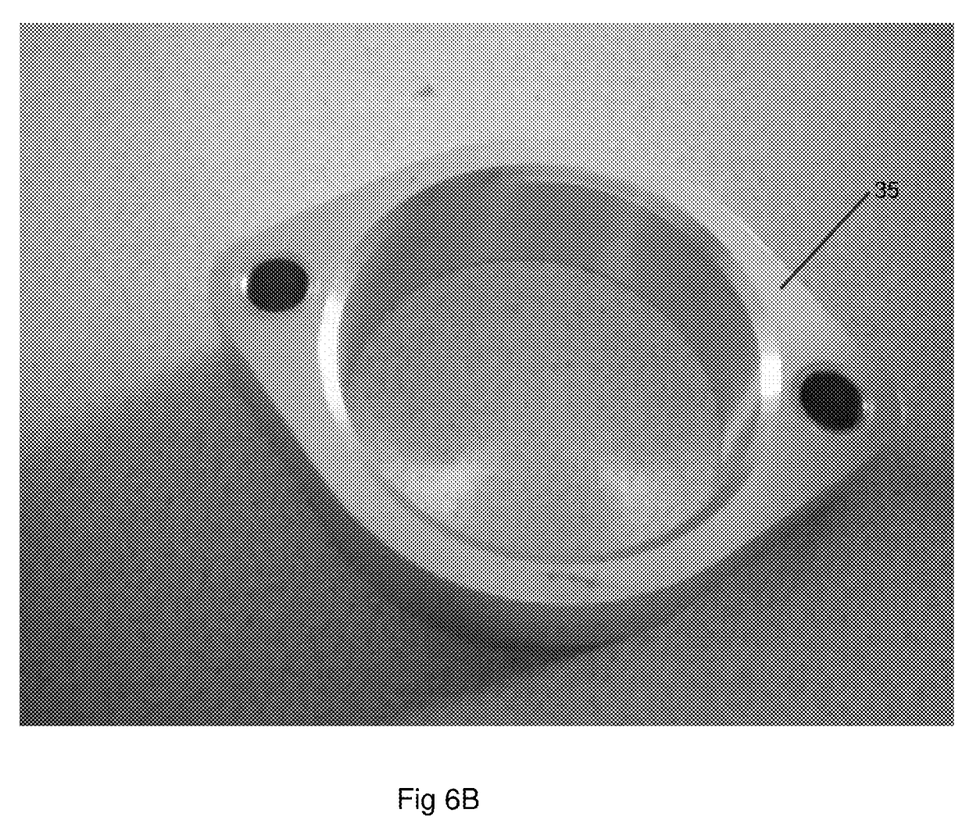
FIG. 6B is a view of the aluminum spacer block 35.

To install the kit, one first raises the auger to the raised and latched position. Then, one removes the grain deflector. Next, one removes the bearing from the top of the auger 18. Then, one bolts around the auger tube 20, the collar 24. At this point, the installer must determine whether it is an old or new style auger. FIG. 6 shows the position of the aluminum spacer block 33 or 35, the hex stub shaft 51, the bearing with a hex inter diameter 53 and the carriage bolts 39. For the old style auger the ½ in. thick aluminum spacer block 33 and 2-10 mm×45 mm carriage bolts 39 are used. For the new style auger, the bearing neck 47 is cut off the auger as shown in FIG. 6A. Then, FIG. 6 shows the position of the aluminum spacer block 35, the hex shaft stub 51, the bearing with a hex inter diameter 53, and 2-10 mm×55 mm carriage bolts 39.

Figure 2:
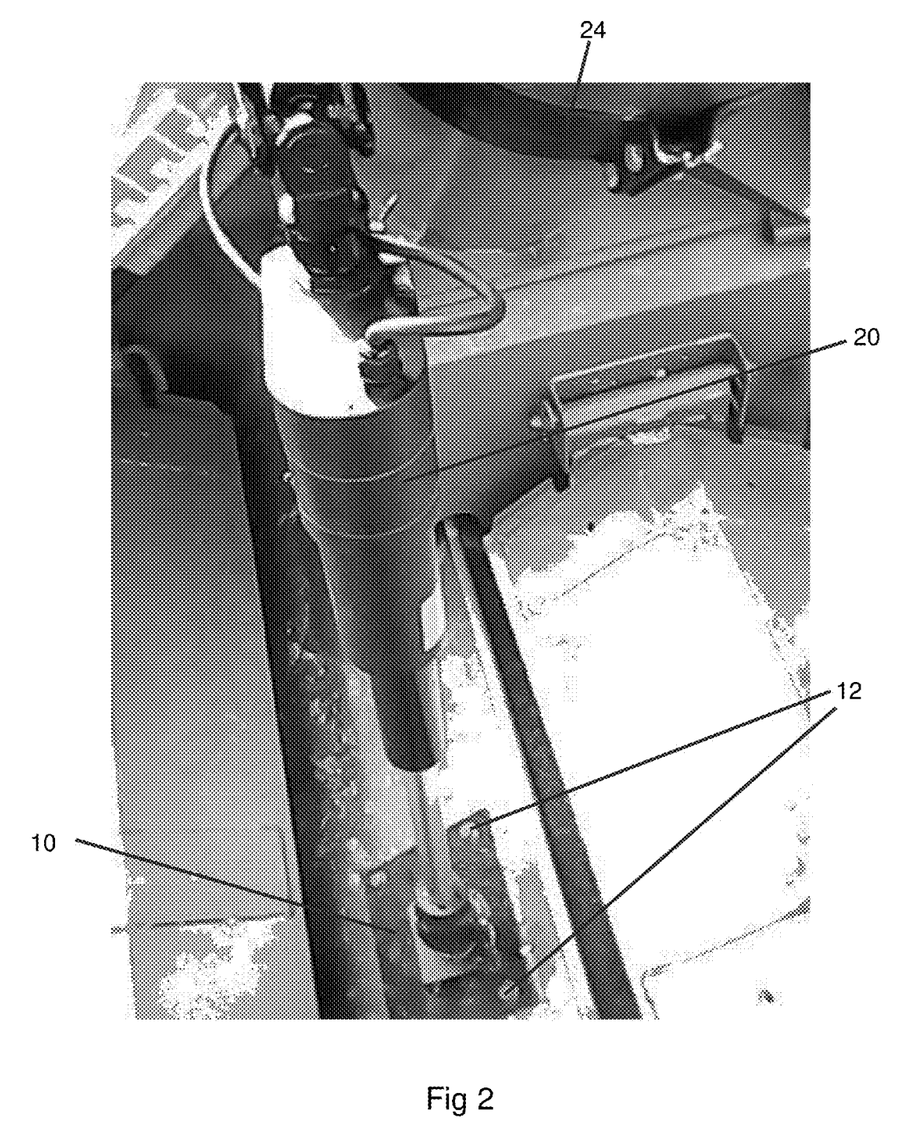
FIG. 2 is a view of the mounting plate on the bottom of the grain bin.

Next, one takes the mounting plate 10 and fastens the mounting plate 10 with bolts 12 to the bottom of the combine's grain tank as shown in FIG. 2. The next step, one remove the actuator from the kit and extends it to its maximum length. Next, one places the linear actuator bottom pin 22 in the bottom universal joint's 16 top socket 36. Then, one places the top universal joint's 36 bottom socket 40 on top of the linear actuator's 20 top pin 42. The ensuing step is to take the bottom universal joint 16 and place bottom socket 34 over the mounting plate pin 14. The installer then aligns the top universal joint's top socket 38 with the pin 30 in the collar 24. If the kit has been properly installed, the linear actuator 20 should be approximately vertical to the ground when the auger tube 18 is in operating position.

The next operation is to wire the linear actuator 12. After wiring the linear actuator 12, the operator releases the latch on the auger tube 18 and folds the auger tube 18 down. The final step, the installer places the safety limiting switch 44 at the edge of the opening 21 in a position that when the auger tube 18 is in operating position, it will activate the safety limiting switch 44. The safety limiting switch 44 is then wired. Once all the wiring is completed, the installer returns to the combine's cabin and tests the system. The auger tube 18 should be able to be raised and lowered without problems and the safety system should give proper responses to the auger tube 18 in the folded and operating position.

I claim:

1. A device for a combine with both an auger that brings the grain up and a grain tank's folding auger with an auger tube, that raises and lowers the combine grain tank's folding auger tube comprising:
   a. a mounting plate adapted to be bolted to the floor of the gain tank; and,
   b. a collar adapted to encircles the auger tube; and,
   c. a linear actuator that at a first end is attached to the mounting plate and a second end that is attached to the collar that encircles the auger tube; and,
   d. wiring system to attach the linear actuator to the combine electrical system; and,
   e. a switch attach to the wiring system that can turn on and off the linear actuator and change the direction of the movement of the linear actuator; and,
   f. a mechanical means to notify the operator the folding auger is in operating position.

2. A device for a combine with both an auger that brings the grain up and a grain tank's folding auger with an auger tube, that raises and lowers the combine grain tank's folding auger tube as in claim 1 wherein:
   a. the floor of the grain tank is not parallel to the ground and the mounting plate has a pin that is secured to the mounting plate so that the pin is vertical to the ground and said pin is adapted to attach the mounting to the second universal joint's bottom.

3. A device for a combine with both an auger that brings the grain up and a grain tank's folding auger with an auger tube, that raises and lowers the combine grain tank's folding auger tube as in claim 1 wherein:
   a. the collar comprises:
      (1.) a circular piece of sufficient size to fit around the auger tube; and,
      (2.) a pin affixed to the circular piece that is adapted to attach the circular piece to the first universal joint.

4. A device for a combine with both an auger that brings the grain up and a grain tank's folding auger with an auger tube, that raises and lowers the combine grain tank's folding auger tube as in claim 3 wherein:
   a. the circular piece comprises:
      (1.) two steel semicircular sections that are bolted together to form a circular piece; and,
      (2.) the pin is welded to the circular piece.

5. A device for a combine with both an auger that brings the grain up and a grain tank's folding auger with an auger tube, that raises and lowers the combine grain tank's folding auger tube as in claim 1 further wherein:
   a. the means to notify the operator the folding auger is in operating position is a limiting switch.

6. A device for a combine with both an auger that brings the grain up and a grain tank's folding auger with an auger tube, that raises and lowers the combine grain tank's folding auger tube as in claim 5 wherein:
   a. the limiting switch is position at the point where the auger tube folds away from the auger that brings the grain up in the combine such that when the auger tube raises to operating position the auger tube folds toward the auger that brings the grain up in the combine and activates the limiting switch by contacting the button of the limiting switch which notifying the operator that the folding auger is in operating position.

7. A device for a combine with both an auger that brings the grain up and a grain tank's folding auger with an auger tube, that raises and lowers the combine grain tank's folding auger tube as in claim 5 wherein:
   a. the combine has a bin full switch and alarm,
   b. the limiting switch is wired in parallel with the bin full switch so that when the limiting switch is activated the bin is full alarm will go off in the cab signaling the auger tube is in the folded position.

8. A device for a combine with both an auger that brings the grain up and a grain tank's folding auger with an auger tube, that raises and lowers the combine grain tank's folding auger tube as in claim 1 further comprising:
   b. a mechanical means to ensure that the drive hub on the gear case does not interfere with the drive pin on the auger.

9. A device for a combine with both an auger that brings the grain up and a grain tank's folding auger with an auger tube, that raises and lowers the combine grain tank's folding auger tube as in claim 8 wherein:
   a. the means to ensure that the drive hub on the gear case does not interfere with the drive pin on the auger is a bearing and a spacer bar that enables the auger to float up far enough in the bearing to give the drive hub and drive pins enough room that they will not inhibit each other when folding the auger into the operating position.

10. A device for a combine with both an auger that brings the grain up and a grain tank's folding auger with an auger tube, that raises and lowers the combine grain tank's folding auger tube comprising:
 a. a mounting plate adapted to be bolted to the floor of the gain tank; and,
 b. a collar adapted to encircles the auger tube; and,
 c. a linear actuator; and,
 d. a first universal joint with a top and bottom attached on the first universal joint's bottom to the linear actuator; and,
 e. a pin affixed to the collar that is adapted to attach the collar to the first universal joint's top; and,
 f. a second universal joint with a top and bottom attached on the second universal joint's top to the linear actuator and attached on the second universal joint's bottom to the mounting plate; and,
 g. wiring system to attach the linear actuator to the combine electrical system; and,
 g. a switch attach to the wiring system that can turn on and off the linear actuator and change the direction of the movement of the linear actuator.

11. A device for a combine with both an auger that brings the grain up and a grain tank's folding auger with an auger tube, that raises and lowers the combine grain tank's folding auger tube as in claim 10 wherein:
 b. the floor of the grain tank is not parallel to the ground and the mounting plate has a pin that is secured to the mounting plate so that the pin is vertical to the ground and said pin is adapted to attach the mounting to the second universal joint's bottom.

12. A device for a combine with both an auger that brings the grain up and a grain tank's folding auger with an auger tube, that raises and lowers the combine grain tank's folding auger tube as in claim 10 further comprising:
 a. a means to notify the operator the folding auger is in operating position.

13. A device for a combine with both an auger that brings the grain up and a grain tank's folding auger with an auger tube, that raises and lowers the combine grain tank's folding auger tube as in claim 12 wherein:
 a. a mechanical means to ensure that the drive hub on the gear case does not interfere with the drive pin on the auger.

14. A device for a combine with both an auger that brings the grain up and a grain tank's folding auger with an auger tube, that raises and lowers the combine grain tank's folding auger tube as in claim 13 wherein:
 a. the means to ensure that the drive hub on the gear case does not interfere with the drive pin on the auger is a bearing that enables the auger to float up and down in the bearing giving the drive hub and drive pins enough room that they will not interfere with each other when folding the auger into the operating position.

15. A device for a combine with both an auger that brings the grain up and a grain tank's folding auger with an auger tube, that raises and lowers the combine grain tank's folding auger tube as in claim 10 further comprising:
 a. a mechanical means to ensure that the drive hub on the gear case does not interfere with the drive pin on the auger.

16. A device for a combine with both an auger that brings the grain up and a grain tank's folding auger with an auger tube, that raises and lowers the combine grain tank's folding auger tube as in claim 15 wherein:
 a. the means to ensure that the drive hub on the gear case does not interfere with the drive pin on the auger is a bearing that enables the auger to float up and down in the bearing giving the drive hub and drive pins enough room that they will not interfere with each other when folding the auger into the operating position.

17. A device for a combine with both an auger that brings the grain up and a grain tank's folding auger with an auger tube, that raises and lowers the combine grain tank's folding auger tube comprising:
 a. a mounting plate adapted to be bolted to the floor of the gain tank; and,
 b. a collar adapted to encircles the auger having a drive pin tube; and,
 c. a linear actuator that at a first end is attached to the mounting plate and a second end that is attached to the collar that encircles the auger tube; and,
 d. wiring system to attach the linear actuator to the combine electrical system; and,
 e. a switch attach to the wiring system that can turn on and off the linear actuator and change the direction of the movement of the linear actuator; and,
 f. a drive hub on a gear case; and
 g. a mechanical means to ensure that the drive hub on the gear case does not interfere with the drive pin on the augur.

18. A device for a combine with both an auger that brings the grain up and a grain tank's folding auger with an auger tube, that raises and lowers the combine grain tank's folding auger tube as in claim 17 wherein:
 b. the collar comprises:
  (1.) a circular piece of sufficient size to fit around the auger tube; and,
  (2.) a pin affixed to the circular piece that is adapted to attach the circular piece to the first universal joint.

19. A device for a combine with both an auger that brings the grain up and a grain tank's folding auger with an auger to r tube, that raises and lowers the combine grain tank's folding auger tube as in claim 17 further comprising:
 a. a means to notify the operator the folding auger is in operating position.

20. A device for a combine with both an auger that brings the grain up and a grain tank's folding auger with an auger tube, that raises and lowers the combine grain tank's folding auger tube as in claim 17 wherein:
 a. the means to ensure that the drive hub on the gear case does not interfere with the drive pin on the auger is a bearing and a spacer bar that enables the auger to float up far enough in the bearing to give the drive hub and drive pins enough room that they will not inhibit each other when folding the auger into the operating position.

* * * * *